June 19, 1945.    P. B. PLACE    2,378,862
STEAM SEPARATOR
Original Filed April 29, 1941
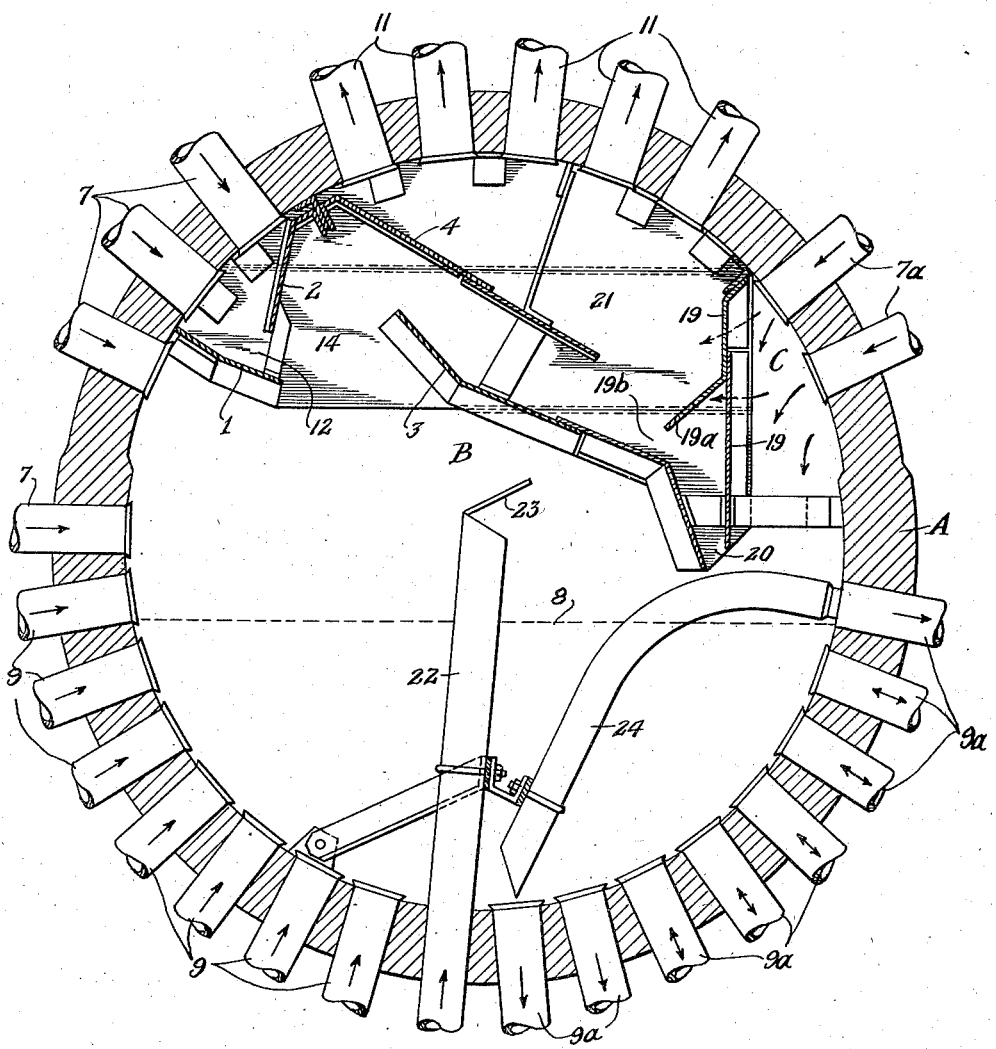
INVENTOR
Palmer B. Place
BY
ATTORNEYS Patented June 19, 1945

2,378,862

UNITED STATES PATENT OFFICE 2,378,862

STEAM SEPARATOR

Palmer B. Place, Tenafly, N. J., assignor to Combustion Engineering Company, Inc., New York, N. Y., a corporation of Delaware Original application April 29, 1941, Serial No. 390,879. Divided and this application February 12, 1944, Serial No. 522,160

3 Claims. (Cl. 122—491)

This invention relates to steam separators and is a division of my application Serial No. 390,879, filed April 29, 1941.

Reference is also made to my Patent No. 2,357,423, issued September 5, 1944, which contains broad claims common to the subject matter of both applications, as well as claims directed to a number of species therein illustrated.

This present application is directed to a species shown in the aforesaid application Serial No. 390,879, but not therein specifically claimed.

The objective of the species of this application, like those of the aforesaid applications, is to secure a very effective separation of water and steam, so that the carry-over of water into the equipment operated by the steam developed by the boiler, is reduced to a minimum. More specifically, it is an object of the invention to make it possible to operate at much higher concentrations of solid matter in the boiler water, before it is necessary to blow down.

How the foregoing is accomplished is illustrated in the accompanying drawing which is a sectional view through a boiler embodying my improvements.

Referring to the drawing, the reference character A denotes the steam and water drum of the boiler. Into this drum there is delivered a mixture of steam and water through a plurality of rows of tubes 7 which deliver such mixture into the space in the drum above the normal water level, indicated at 8. Other tubes 9 deliver mixture into the drum, some of them approximately at the normal water level and others below. The reference 9a indicates tubes some of which are downcomer tubes and others of which are tubes in which the flow may at times be upward into the drum or at times downward from the drum. The reference numeral 11 indicates steam outlet means, in this instance a number of rows of tubes.

Extending inwardly from the drum wall at a point below the second row of tubes 7 is a longitudinally extending baffle 1. Cooperating with this is a second baffle 2. The baffles 1 and 2 are joined at each end with end baffles 14. Thus the baffles 1 and 2, together with the end baffles, cooperate to receive steam and water mixture discharged into the drum from the two upper rows of tubes 7.

The baffle 2 also extends inwardly from the drum wall and terminates short of the baffle 1, leaving a longitudinal slot 12. Thus the steam and water mixture delivered by the two upper rows of tubes 7 is continuously discharged from the space defined by baffles 1 and 2 and the end baffles 14, in the form of a longitudinally extending continuous sheet. The line of discharge of such stream or sheet is such as to cause the sheet to impinge at an acute angle on the main baffle 3, which rises from a point close to the normal water level, upwardly and rearwardly, to a point preferably just above the upper edge of the slot 12, said main baffle terminating short of the baffle 2. Thus there is a discharge opening formed by baffles 2 and 3 establishing communication between the space below baffles 1 and 3, and the space above baffle 3.

A fourth baffle 4 also extends inwardly from the drum wall at a point adjacent the baffle 2, said baffle 4 extending downwardly and being spaced away from baffle 3 and terminating at a point some distance past the upper edge of baffle 3. Steam leaving the discharge opening between baffles 2 and 3 makes a bend in entering the space between baffles 3 and 4, and then bends again on itself to travel through the space above baffle 4 to the outlet tubes 11. It will be understood that baffles 3 and 4 likewise join with the end baffles 14.

It will thus be seen that the sheet of entering steam and water mixture is interposed between the opening between baffles 2 and 3 and the space therebelow. The sheet, after impinging upon baffle 3, bends downwardly, crowds toward the apex of the space defined by baffle 3 and the water, and then turns toward the left. The sheet thus constitutes a continuous barrage interposed just in advance of the opening between baffles 2 and 3, through which barrage all steam leaving the space below baffles 1 and 3 must pass on its way to said opening and eventually to the steam outlet means.

The velocity of this barrage is relatively high because it will travel some distance before it loses its initial velocity. Thus the steam in attempting to escape through the opening and to the outlet is subjected to a relatively dense mixture moving at relatively high velocity, in consequence of which a substantial portion of the water contained in the steam is, as it were, beaten out and carried down toward the normal water level of the drum. Moreover, all foam attempting to leave the space below baffles 1 and 3 must also pass through such barrage and receive the impact thereof. This foam consists of water bubbles which are broken up by the impact of the barrage. In consequence, the steam leaving the opening between baffles 2 and 3 is largely deprived of water and substantially completely deprived of foam.

The baffle 4 is not necessarily employed, but when employed it is intended to remove a large portion of any remaining water in the steam by causing the steam to change direction of flow.

It will be seen from inspection of the drawing that one or more of the tubes 22 rises upwardly to a point above the normal water level 8, the discharge being deflected by means of the hood 23. A pipe or pipes 24 are also provided which extend from a point adjacent the bottom of the drum upwardly, being curved to discharge in the uppermost row of tubes 9a at the right.

By reason thereof, the baffle 3 cannot be extended to the normal water level, leaving a space between the bottom edge of the baffle and the water. To prevent any substantial amount of steam from passing under the bottom edge of the baffle 3, the following provision is made. A baffle 19 extends downwardly from the drum wall to a point approximately in line with the lower edge of the baffle 3, baffle 19 being spaced away to provide an opening 20 between it and baffle 3. One or more rows of tubes 7a deliver a steam and water mixture into the space between the drum wall and baffle 19, this steam and water mixture flowing downwardly and then around the lower edge of baffle 3. This also is high velocity steam and water mixture which counteracts the tendency of any of the slower moving steam to leave the space below baffle 3 and flow around the lower end of baffle 3 to the right. Furthermore, separated water, separated in the space above baffle 3, tends to run down the various surfaces and into the throat or outlet 20, this also helping to prevent steam from passing from beneath the baffle 3 around the lower edge thereof to the right. Foam, by the foregoing arrangements, is also prevented from passing upwardly through throat 20.

To assist in turning steam passing between baffles 3 and 4 toward the steam outlet, baffle 19a is provided.

By the foregoing, the steam and water are so effectively separated that it is possible to operate the boiler, before blow down, at concentrations at least several times greater than the concentration permissible by the conventional types of separator means employed.

I claim:

1. In a steam and water drum having means for delivering a mixture of steam and water thereinto above the normal water level thereof and having steam outlet means from an upper part thereof, means for separating water and steam comprising a longitudinally extending first baffle, extending inwardly from the drum wall at a point adjacent said means for delivering said mixture into the drum, a longitudinally extending second baffle also extending inwardly from the drum wall and to a point adjacent to but short of the first baffle and cooperating with the first baffle to define a longitudinally extending slot and a space for receiving said mixture as it is delivered into the drum, a longitudinally extending third baffle having its lower edge at a point above but adjacent to the normal water level near that side of the drum opposite said discharge slot, and extending upwardly to a point short of the second baffle and above said discharge slot to thereby provide an opening between the third and second baffles located above the said discharge slot and providing communication between the space below the first and third baffles and the space above the third baffle, said first and second baffles being so disposed that the steam and water mixture delivered into the space defined thereby is discharged through said slot in the form of a longitudinally extending continuous sheet or barrage interposed between said opening and the space below the first and third baffles, the third baffle being so located with respect to the first and second baffles that the said sheet impinges thereon at a relatively small angle, end cross baffles for said baffles, and means for preventing steam and foam from passing around the lower edge of said third baffle.

2. In a steam and water drum having means for delivering a mixture of steam and water thereinto above the normal water level thereof and having steam outlet means from an upper part thereof, means for separating water and steam comprising a longitudinally extending first baffle, extending inwardly from the drum wall at a point adjacent said means for delivering said mixture into the drum, a longitudinally extending second baffle also extending inwardly from the drum wall and to a point adjacent to but short of the first baffle and cooperating with the first baffle to define a longitudinally extending slot and a space for receiving said mixture as it is delivered into the drum, a longitudinally extending third baffle rising upwardly from a point adjacent to the normal water level and extending toward but terminating at a point short of the second baffle to thereby provide an opening between the third and second baffles located above the said discharge slot and providing communication between the space below the first and third baffles and the space above the third baffle, said first and second baffles being so disposed that the steam and water mixture delivered into the space defined thereby is discharged through said slot in the form of a longitudinally extending continuous sheet or barrage interposed between said opening and the space below the first and third baffles, the third baffle being so located with respect to the first and second baffles that the said sheet impinges thereon at a relatively small angle, end cross baffles for said baffles, and means for preventing steam and foam from passing around the lower edge of said third baffle, said means comprising a fourth baffle extending inwardly from the drum wall and downwardly to a point approximately the level of the lower edge of the third baffle but spaced away therefrom, and means for delivering steam and water mixture into the space between the fourth baffle on the drum wall which is away from the third baffle.

3. In a steam and water drum having means for delivering a mixture of steam and water thereinto above the normal water level thereof and having steam outlet means from an upper part thereof, means for separating water and steam comprising a longitudinally extending first baffle, extending inwardly from the drum wall at a point adjacent said means for delivering said mixture into the drum, a longitudinally extending second baffle also extending inwardly from the drum wall and to a point adjacent to but short of the first baffle and cooperating with the first baffle to define a longitudinally extending slot and a space for receiving mixture delivered into the drum, a longitudinally extending third baffle rising upwardly from a point adjacent to the normal water level and extending toward but terminating at a point short of the second baffle to thereby provide an opening between the third and second baffles located above the said discharge slot and providing communication between the space below the first and third baffles and the space above the third baffle, said first and second baffles being so disposed that the steam and water mixture delivered into the space defined thereby is discharged through said slot in the form of a longitudinally extending continuous sheet or barrage interposed between said opening and the space below the first and third baffles, the third baffle being so located with respect to the first and second baffles that the said sheet impinges thereon at a relatively small angle, end cross baffles for said baffles, means for preventing steam and foam from passing around the lower edge of said third baffle, said means comprising a fourth baffle extending inwardly from the drum wall and downwardly to a point approximately the level of the lower edge of the third baffle but spaced away therefrom, and means for delivering steam and water mixture into the space between the fourth baffle on the drum wall which is away from the third baffle, together with a fifth baffle extending inwardly and downwardly from the drum wall at a point adjacent the second baffle and extending some distance past the upper edge of the third baffle and being spaced away from said third baffle and terminating short of the fourth baffle, and a sixth longitudinally extending baffle extending inwardly and rearwardly from said fourth baffle to a point short of the third baffle.

PALMER B. PLACE.